United States Patent
Nilsen et al.

(10) Patent No.: US 12,201,102 B2
(45) Date of Patent: Jan. 21, 2025

(54) CAST CONTROL SYSTEM FOR A FISHING REEL

(71) Applicant: Accurate Grinding and Mfg. Corp., Corona, CA (US)

(72) Inventors: David Nilsen, Coto de Caza, CA (US); Douglas Nilsen, Laguna Hills, CA (US)

(*) Notice: Subject to any disclaimer, the term of this patent is extended or adjusted under 35 U.S.C. 154(b) by 185 days.

(21) Appl. No.: 17/743,323

(22) Filed: May 12, 2022

(65) Prior Publication Data
US 2023/0363368 A1  Nov. 16, 2023

(51) Int. Cl.
*A01K 89/01* (2006.01)
*A01K 89/015* (2006.01)
*A01K 89/033* (2006.01)

(52) U.S. Cl.
CPC ........ *A01K 89/048* (2015.05); *A01K 89/0179* (2015.05); *A01K 89/0192* (2015.05); *A01K 89/01931* (2015.05); *A01K 89/059* (2015.05)

(58) Field of Classification Search
CPC ........ A01K 89/01557; A01K 89/01555; A01K 89/0182; A01K 89/01903; A01K 89/01908; A01K 89/0192; A01K 89/051; A01K 89/059; A01K 89/01931
See application file for complete search history.

(56) References Cited

U.S. PATENT DOCUMENTS

| | | | | |
|---|---|---|---|---|
| 3,986,678 A * | 10/1976 | Coquelet | ......... | A01K 89/01557 188/185 |
| 5,393,005 A * | 2/1995 | Nakajima | ........ | A01K 89/01557 242/289 |
| 5,782,420 A * | 7/1998 | Forslund | .......... | A01K 89/01557 242/322 |
| 5,865,387 A * | 2/1999 | Hirano | ............... | A01K 89/0155 188/185 |
| 5,984,221 A * | 11/1999 | Kim | ................. | A01K 89/01557 188/185 |
| 6,102,316 A * | 8/2000 | Nilsen | .................. | A01K 89/015 242/255 |
| 6,168,106 B1 * | 1/2001 | Cockerham | ........ | A01K 89/0155 188/185 |
| 6,206,311 B1 * | 3/2001 | Kim | ................. | A01K 89/01555 242/304 |
| 6,394,381 B1 * | 5/2002 | Hirayama | ........ | A01K 89/01557 188/181 A |
| 6,435,438 B1 * | 8/2002 | Hyon | ................. | A01K 89/0155 188/181 A |
| 2011/0011966 A1 * | 1/2011 | Takechi | ............. | A01K 89/0192 242/255 |
| 2011/0079672 A1 * | 4/2011 | Kim | ................. | A01K 89/01557 242/289 |
| 2020/0296947 A1 * | 9/2020 | Chew | ............... | A01K 89/01928 |

FOREIGN PATENT DOCUMENTS

EP     1051906 A2 * 11/2000   ....... A01K 89/01557

* cited by examiner

*Primary Examiner* — Emmanuel M Marcelo (57) ABSTRACT

A fishing reel includes a casing having an inner surface. The fishing reel further includes a spool assembly configured to rotate about an axis and having an outer surface located radially inward relative to the inner surface of the casing and defining at least one pocket. The fishing reel further includes at least one body configured to be received by the at least one pocket and to move within the at least one pocket between a first position in which the at least one body fails to contact the inner surface of the casing and a second position in which the at least one body contacts the inner surface of the casing.

18 Claims, 6 Drawing Sheets

CAST CONTROL SYSTEM FOR A FISHING REEL

BACKGROUND

1. Field

The present disclosure relates to lever drag fishing reels with improved cast control systems.

2. Description of the Related Art

Fishermen prefer different types of fishing reels for various situations. Star drag reels provide reduced friction while in free spool relative to lever drag reels. Lever drag reels, on the other hand, allow an angler to know a precise amount of drag that is applied to the line at all times, and allow an angler to switch between multiple known amounts of drag (e.g., between a maximum drag amount and a strike drag amount). Lever drag reels furthermore may provide a greater amount of drag force than a star drag reel. Furthermore, some lever drag reels are provided as two speed reels, whereas no two speed star drag reels have entered the market. These two speed reels allow an angler to fight a fish using multiple gear ratios such as a relatively low gear ratio (e.g., 3:1, usable apply more force to a heavy fish) and a relatively high gear ratio (e.g., 6:1, usable for fast retrieval such as while jig fishing). Both types of reels can be used to cast baits and lures long distances.

Occasionally, when a lure or bait hits water after a cast, the speed of line being unwound from the spool decreases because the lure or bait ceases traveling through the air and slows down upon contact with the water. In such a situation, the spool may continue to rotate due to the previous momentum caused by the fast line unwinding while the lure or bait flew through the air. Such mismatch in spool rotation and line unwinding may cause extra line that unwinds from the spool to continue rotating around the spool and becoming tangled with additional loose line around the spool (which may be referred to as "backlash"). Such tangles are undesirable as they may cost a significant amount of time to untangle (which takes time away from fishing) and may result in the line becoming so tangled that the line must be cut off and, thus, replaced. Targeted braking of the angular (i.e., rotational) velocity of the spool may be referred to as cast control. Some fishing reels may be designed to include a cast control system to brake (i.e., reduce) the angular velocity of the spool in such situations. These cast control systems may reduce the occurrence of backlash, thus improving performance of the fishing reel and allowing an angler to cast farther due to the reduced likelihood of backlash.

In addition, a general trend in the industry is to reduce a mass of fishing reels as much as possible while still providing sufficient drag to stop a fish having considerable mass and fighting power. This reduced mass allows an angler to fish for longer periods of time without becoming tired, and further allows an angler to use more energy-intensive jigging techniques (such as slow pitch jigging).

Thus, there is a need in the art for improved cast control systems for increasing castability of reels while reducing backlash and reducing a total mass of the fishing reel.

SUMMARY

Described herein is a fishing reel. The fishing reel includes a casing having an inner surface. The fishing reel further includes a spool assembly configured to rotate about an axis and having an outer surface located radially inward relative to the inner surface of the casing and defining at least one pocket. The fishing reel further includes at least one body configured to be received by the at least one pocket and to move within the at least one pocket between a first position in which the at least one body fails to contact the inner surface of the casing and a second position in which the at least one body contacts the inner surface of the casing.

Also described is a fishing reel. The fishing reel includes a casing having an inner surface. The fishing reel further includes a spool assembly configured to rotate about an axis. The fishing reel further includes at least one body configured to be rotatably coupled to the spool assembly and to rotate with the spool assembly about the axis, the at least one body being further configured to move between a first position in which the at least one body fails to contact the inner surface of the casing and a second position in which the at least one body contacts the inner surface of the casing.

Also described is a fishing reel. The fishing reel may include a casing having an inner surface. The fishing reel may further include a spool assembly configured to rotate about an axis and having a spool and a spool cover configured to be coupled to the spool, the spool cover including an outer surface located radially inward relative to the inner surface of the casing and defining a plurality of pockets. The fishing reel may further include a plurality of bodies each configured to be received by a respective pocket of the plurality of pockets and to move within the respective pocket between a first position in which a respective body fails to contact the inner surface of the casing and a second position in which the respective body contacts the inner surface of the casing

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes a fishing reel, such as a lever drag fishing reel, with improved cast control features for reducing backlash and increasing performance of the fishing reel. A lever drag fishing reel, as opposed to a star drag fishing reel, includes a lever that allows for relatively gradual adjustment of an amount of drag applied to a spool by known amounts. A star drag fishing reel, on the other hand, provides a single switch to engage or disengage the drag mechanism as well as a drag lever with a plurality of arms extending therefrom that allows for adjustment of the amount of drag while the drag is applied to the spool. The cast control mechanism disclosed herein may be specifically designed for use with a lever drag reel to improve operation of the fishing reel by reducing the likelihood of backlash occurring while casting. This allows an angler to cast farther and waste less time untangling fishing line as a result of backlashes. Additionally, the cast control mechanism disclosed herein is designed to reduce a total weight of the fishing reel relative to alternative cast control designs, in turn allowing anglers to spend more time fishing with the reel before becoming tired.

In particular and referring to FIGS. 1, 2, 3, 4, 5, and 6 (FIGS. 1-6), a fishing reel 100 may be designed to have a cast control system or mechanism 101. The fishing reel 100 may include a casing 102 (or housing) which houses at least a portion of components of the fishing reel 100. The casing 102 may include external components, in which case a portion of such components are exposed to an environment of the fishing reel 100, may include internal components which lack exposure to the environment of the fishing reel 100, or may include external components and internal components. In particular, the casing 102 may include a main housing 104. The casing 102 may also include a shaft housing 105 which may at least partially house a main shaft 148. At least a portion of a spool assembly 108 may also be considered a portion of the casing 102. In some embodiments, at least one of the casing 102, the main housing 104, or the shaft housing 105 may include multiple components coupled together. For example, the main housing 104 may include multiple pieces coupled together to form the main housing 104. In some embodiments, at least one of the casing 102, the main housing 104, or the shaft housing 105 may be formed integral or monolithic. In some embodiments, two or more of the casing, the main housing 104, and the shaft housing 105 may be formed integrally or monolithic with each other.

Figure 1:
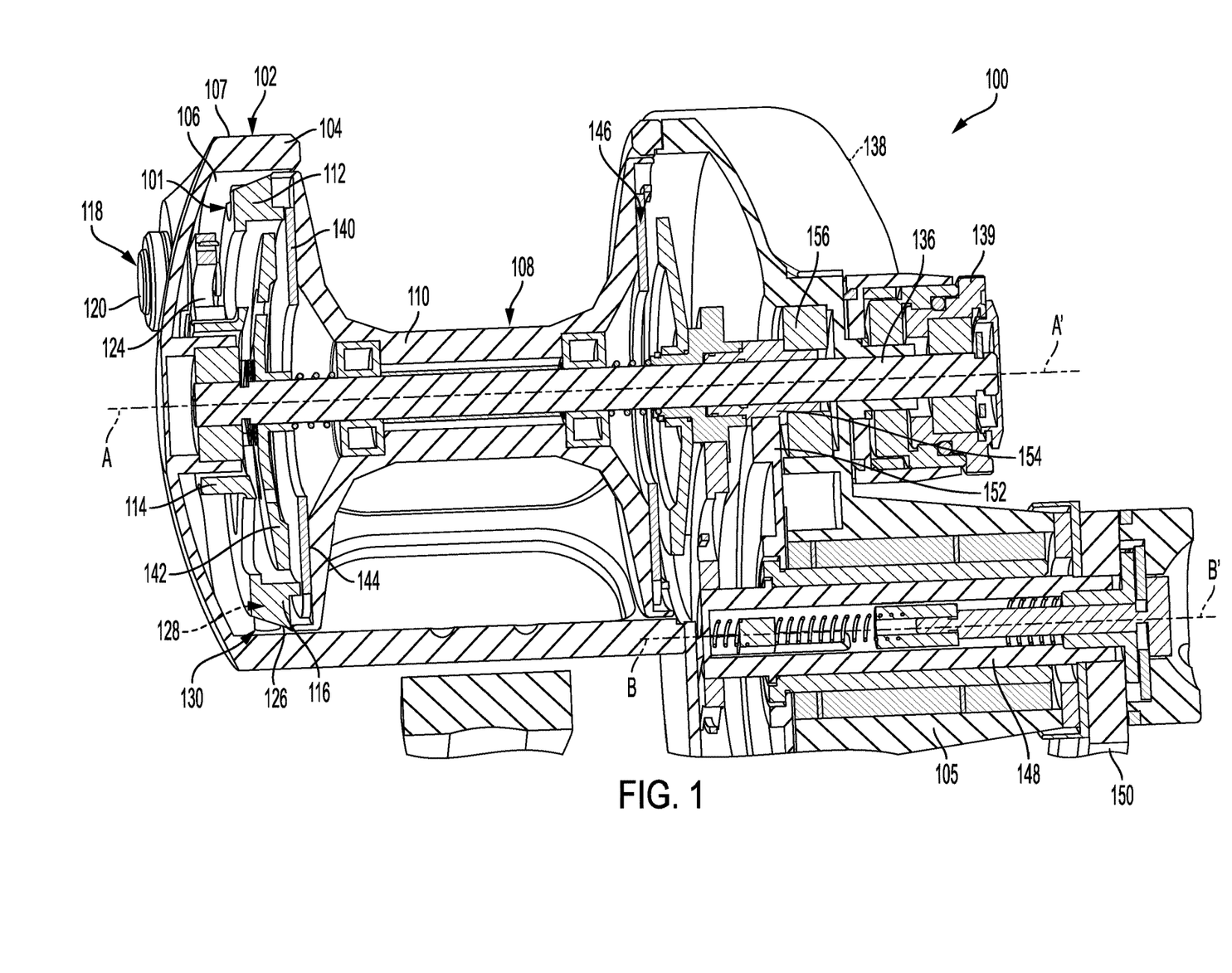
FIG. 1 is a cross-sectional view of a lever drag fishing reel having various improvements including an improved cast control mechanism according to some embodiments of the present disclosure.

The main housing 104 may be made from any material such as a metal (e.g., a corrosion-resistant aluminum, such as aircraft grade aluminum), a plastic, another polymer, or the like. Additional components of the fishing reel 100 (e.g., any components such as a spool 110, a spool cover 112, a handle 150, or the like) may likewise be made, or may include, any materials such as metals, plastics, polymers, or the like. All components need not include the same materials. For example, the main housing 104 may include aircraft grade aluminum, a spool shaft 136 may include a steel, the handle 150 may include a plastic, and the like. Likewise, a single component may include multiple materials. For example, the handle 150 may include a metal shaft with a plastic handle wrapped in a rubber.

The main housing 104 may have an inner surface 106 facing radially inward (i.e., towards an axis A-A') and an outer surface 107 which may be exposed to an environment of the fishing reel 100. In some embodiments, the outer surface 107 may be opposite the inner surface 106.

Figure 2:
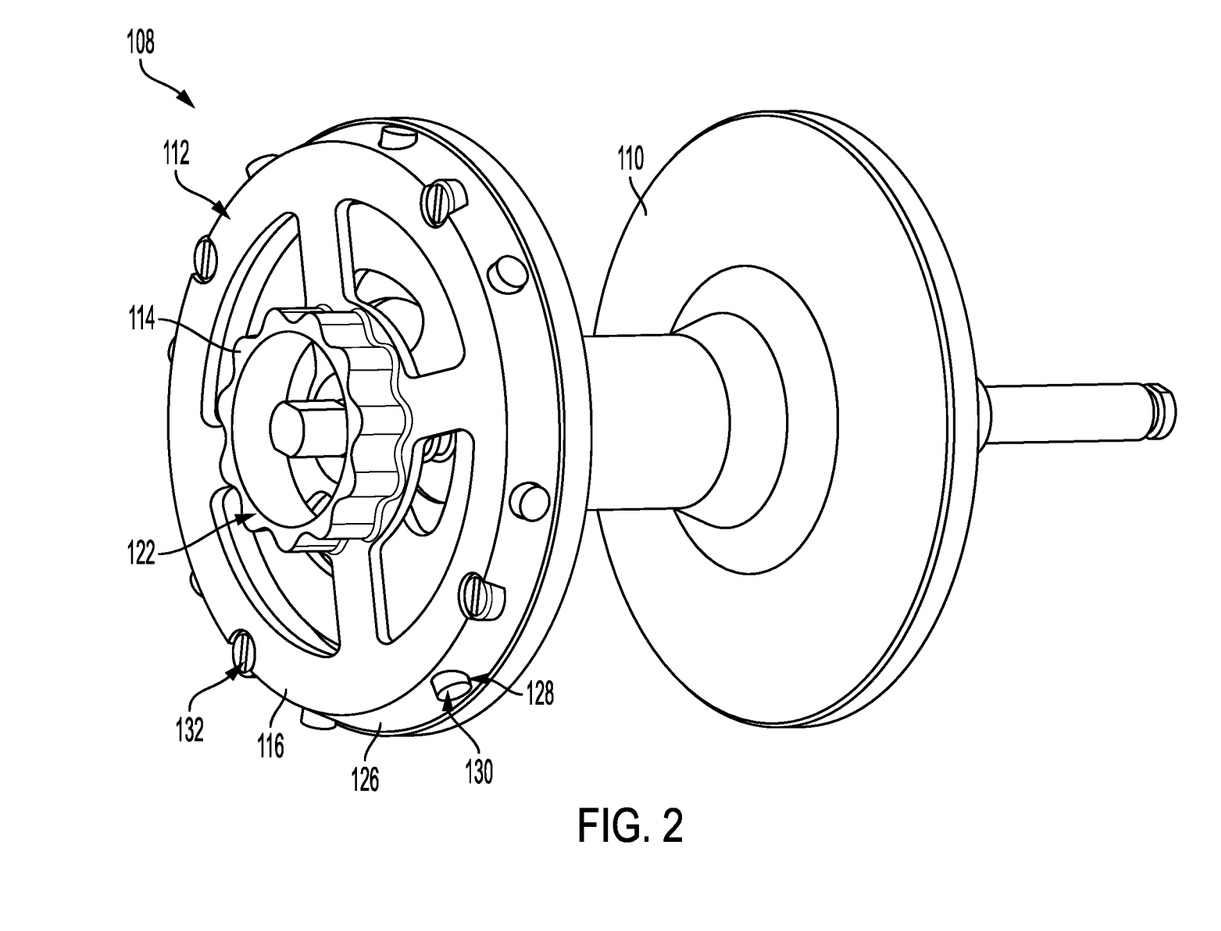
FIG. 2 is an isometric view of a spool assembly of the fishing reel of FIG. 1 according to some embodiments of the present disclosure.
Figure 3:
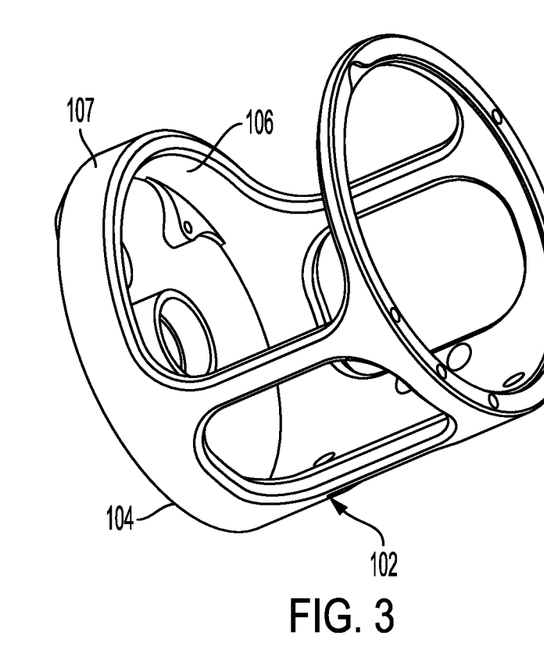
FIG. 3 is an isometric view of a portion of a casing of the fishing reel of FIG. 1 according to some embodiments of the present disclosure.

The fishing reel 100 may also include a spool assembly 108. The spool assembly 108 may include any one or more components that at least partially form a spool portion of the fishing reel 100. For example, the spool assembly 108 may include a spool 110 onto which fishing line becomes wound and unwound. The spool 110 (and, in some embodiments, the entire spool assembly 108) may rotate along with a spool shaft 136 about an axis A-A' in a first direction to wind line onto the spool 110, and may rotate along with the spool shaft 136 in a second direction about the axis A-A' to unwind line from the spool 110. At least one of the spool assembly 108 or the spool 110 may be positioned relatively near the main housing 104 and may at least partially enclose a portion of the fishing reel between the main housing 104 and the spool 110 (or another portion of the spool assembly 108). The spool 110 may rotate relative to the main housing 104 (and the casing 102). In that regard, the casing 102 and/or the main housing 104 may remain stationary relative to the axis A-A' while the spool 110 (and, in some embodiments, additional components of the spool assembly) rotates about the axis A-A'.

The spool assembly 108 may also include a spool cover 112. In some embodiments the spool cover 112 may be coupled to the spool 110. For example, the spool cover 112 may include a plurality of apertures 134 exposed to the spool 110 and fasteners 132 may extend through the apertures 134 and fasten the spool cover 112 to the spool 110. In some embodiments, although not shown herein, the spool cover 112 may also or instead be coupled to the spool shaft 136. In some embodiments, the various components (e.g., between the spool 110 and spool cover 112) may be coupled together using any means such as fasteners, press-fit connections, an interference fit, adhesive, or the like. In some embodiments, the spool cover 112 may also rotate with the spool 110 and the spool shaft 136. In some embodiments, the spool 110 and the spool cover 112 may rotate together while the shaft 136 is allowed to float (i.e., not rotate) relative to the spool 110 and spool cover 112. In some embodiments, the spool cover 112 may be formed integrally (i.e., monolithically) with at least one of the spool 110, the spool shaft 136, or the like.

Figure 4:
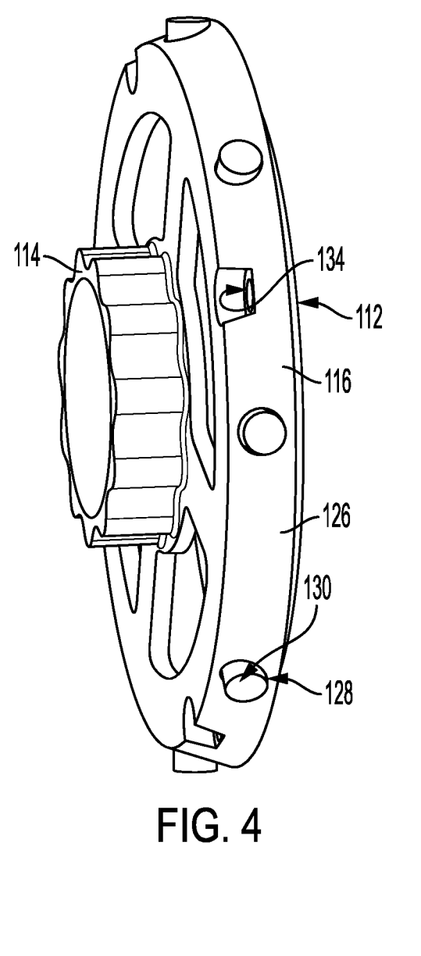
FIG. 4 is an isometric radial view of a spool cover the fishing reel of FIG. 1, the spool cover including a plurality of bodies at least partially housed therein according to some embodiments of the present disclosure.
Figure 5:
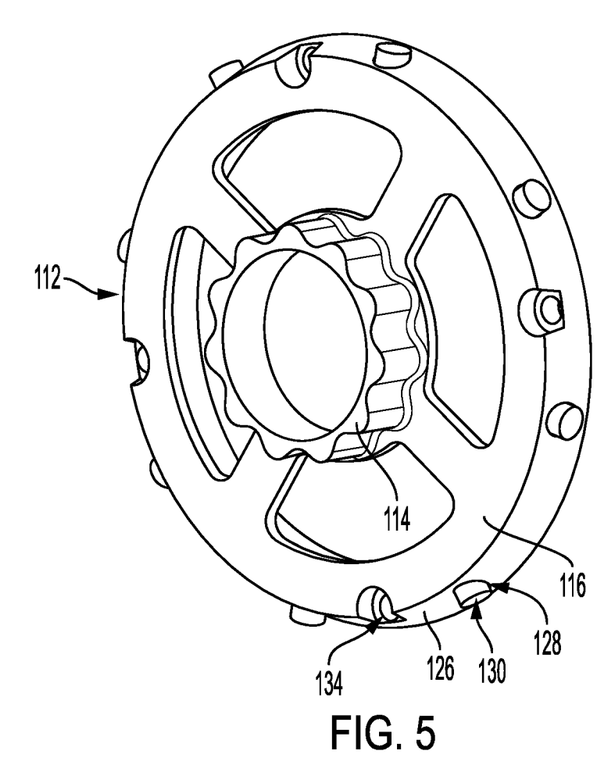
FIG. 5 is an isometric axial view of the spool cover and the plurality of bodies of FIG. 4 according to some embodiments of the present disclosure.
Figure 6:
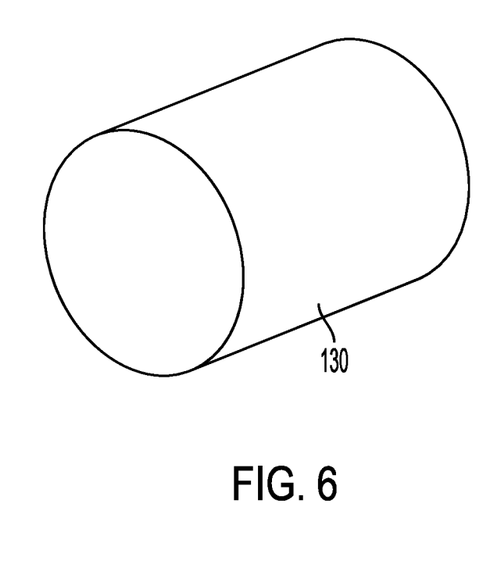
FIG. 6 is an isometric view of a body of the plurality of bodies of FIGS. 4 and 5 according to some embodiments of the present disclosure.

The spool cover 112 may include a clicker portion 114 and a spool portion 116. The clicker portion 114 and the spool portion 116 may be formed monolithic with each other, may be formed separately and coupled together, or the like. The spool portion 116 may have a greater diameter than the clicker portion 114, as the clicker portion 114 may be in contact with and surround the spool shaft 136, and the spool portion 116 may be in contact with (and have a similar diameter as) an outer portion of the spool 110. The clicker portion 114 may be utilized as part of a clicking mechanism 118 which may also include: a button 120 to engage and disengage the clicking features, a plurality of protrusions 122 (e.g., radially-extending protrusions, although axial protrusions are also possible without departing from the scope of the present disclosure) coupled to the clicker portion 114, and an arm 124 coupled to the main housing 104 (i.e., which may remain stationary relative to the rotating portion of the fishing reel 100). The button 120 may have a first position in which the arm 124 may be spaced from the protrusions 122 such that the arm 124 and protrusions 122 fail to make contact in response to rotation of the clicker portion 114, and a second position in which the arm 124 contacts the protrusions 122 as the clicker portion 114 rotates relative to the arm 124. In response to the button 120 being in the second position, the protrusions 122 may contact the arm 124 as they pass by the arm 124 during rotation of the protrusions 122, which may result in a "click" or "pop" noise. Such noise may alert an angler to a hookup with a fish. Engagement of the clicking mechanism 118 (i.e., when the button 120 is in the second position) may provide other advantages such as adding resistance to the spool 110 when the fishing reel 100 is in free spool. In some embodiments, other clicking mechanisms are contemplated such as an arm located on the clicker portion 114 and protrusions coupled to the main housing 104 (e.g., the arm may rotate about an axis and the protrusions may remain stationary relative to the arm), the arm 124 remaining coupled to the main housing 104 and protrusions coupled to a different structure than the spool cover 112, or the like.

The spool portion 116 of the spool cover 112 may be coupled to the spool 110. In that regard, the fasteners 132 may extend through the spool portion 116 and couple the spool portion 116 to the spool 110. In some embodiments, the spool portion 116 may be coupled to the spool 110 in any additional or alternative manner. For example, the spool portion 116 may not be directly coupled to the spool 110, and the clicker portion 114 may be coupled to the spool shaft 136 to cause the spool cover 112 to rotate with the spool 110 (in embodiments in which the spool shaft 136 rotates with the spool 110). The spool portion 116 may, together with the spool 110, define a cavity therebetween. Inclusion of the cavity (rather than solid material) may reduce a weight of the fishing reel 100, thus allowing an angler more opportunity to fish before becoming tired.

The spool shaft 136 may be centered along, and extend parallel to, the axis A-A'. As referenced above, the spool shaft 136 may rotate about the axis A-A' relative to stationary components of the fishing reel 100 (such as the main housing 104). As indicated above, the spool 110 may rotate relative to the spool shaft 136 when the fishing reel 100 is in free spool (i.e., the spool shaft 136 may float relative to the spool 110. As the fishing reel is placed in gear and an angler cranks the handle 150 (and as further described below), the spool shaft 136 (and spool 110) may rotate in a second direction, causing line to wind around the spool 110.

As mentioned above, the fishing reel 100 may be a lever drag fishing reel. In that regard, the fishing reel 100 may include a lever 138 (not shown in detail herein). The lever 138 may be actuated in a first direction relative to the main housing 104 (e.g., into the page as shown in FIG. 1) to engage and to increase an amount of drag applied to the spool 110 (i.e., to place the fishing reel 100 in gear), and may be actuated in a second direction relative to the main housing 104 (e.g., out of the page as shown in FIG. 1) to reduce the amount of drag and to disengage the drag from the spool 110. The lever 138 may be rotated between any of a plurality of locations which each correspond to a particular amount of drag. The fishing reel 100 may also include a drag adjustment control mechanism 139, such as a knob or dial. The drag adjustment control mechanism 139 may be rotated clockwise or counterclockwise to increase and decrease an amount of drag that is applied to the spool 110 in response to engagement of the drag mechanism. For example, the drag may apply a certain force (e.g., 5 pounds) in response to the lever 138 being located in a first position. After adjusting the drag adjustment control mechanism 139, the drag may apply a different force (e.g., 7 pounds) in response to the drag lever 138 being located in the first position.

The fishing reel 100 may include a plurality of drag surfaces as part of the drag mechanism to apply drag to the spool 110. For example, the fishing reel 100 may include a first drag surface 140 (which may be formed on, or coupled to, the spool 110 or spool shaft 136 and may rotate with the spool 110) and a second drag surface 142 (which may be formed as part of, or coupled to, the casing 102 and may remain stationary relative to the spool 110). In some embodiments, the first and second drag surfaces 140, 142 may be located on a first end of the spool 110, and the fishing reel 100 may include additional drag surfaces 146 which may be located on a second end of the spool 110. In some embodiments, the additional drag surfaces 146 may be a mirror image of the first and second drag surfaces 140, 142. Inclusion of the additional drag surfaces 146 may increase an amount of drag which may be applied to the spool 110 or the spool shaft 136, thus making the fishing reel 100 capable of fighting larger fish than would be possible if the fishing reel included only the first and second drag surfaces 140, 142. That is, the drag surfaces 146 on the second end of the spool 110 may increase an amount of drag applied by the fishing reel relative to inclusion of only the first and second drag surfaces 140, 142. Each of the drag surfaces 140, 142, 146 may include friction surfaces, such as metal (which may or may not have a rough surface to increase friction), a polymer with carbon fiber to increase friction applied thereby, both, or any other material or combination of materials. For example, the first drag surface 140 may include a polymer with carbon fibers and the second drag surface 142 may include a metal (e.g., steel or aluminum). Additionally, the first drag surface 140 (and any additional or alternative drag surfaces) may include multiple surfaces thereon. For example, a drag disk may be located axially between two additional drag surfaces, and each surface of the drag disk may include a friction surface for engaging with each additional drag surface. Each side of the spool 110 may include any quantity of drag surfaces. In some embodiments, optimum performance may be obtained by having similar drag surfaces on both sides of the spool 110.

As shown in FIG. 1, the first drag surface 140 may include a washer and may be coupled to the spool 110, for example, using protrusions (e.g., cogs) that interface with apertures or protrusions of the spool 110. That is, a surface 144 of the first drag surface 140 may be radially coupled to the spool 110. In that regard, the interface between the first drag surface 140 and the spool 110 resists rotation of the first drag surface 140 relative to the spool 110. In some embodiments, the first drag surface 140 may be a friction surface formed on a surface of the spool 110 rather than a separate washer. The second drag surface 142 may be coupled (e.g., rotatably coupled) to the main housing 104. For example, the second drag surface 142 may include a washer that is coupled to the main housing 104, for example, using an adhesive, fasteners, protrusions (e.g., cogs), or the like. In that regard, the second drag surface 142 may rotate relative to the first drag surface 140. In some embodiments, the second drag surface 142 may be a friction surface formed on a surface of the main housing 104 rather than a separate washer. Friction may occur between the first drag surface 140 and the second drag surface 142 in response to rotation of the spool 110 relative to the casing 102. Any quantity and configuration of drag surfaces is contemplated and covered within the scope of the present disclosure.

The fishing reel 100 may include a plurality of bearings that reduce friction between parts for which relative motion occurs. For example, a bearing 156 may reduce friction between the spool shaft 136 and the main housing 104. As another example, bearings may exist between the spool shaft 136 and the spool 110 to reduce friction therebetween when the spool shaft 136 is disengaged from the spool 110. Any additional or alternative bearings may be included without departing from the scope of the present disclosure.

The fishing reel 100 may also include a main shaft 148. The main shaft 148 may be coupled (e.g., rotatably coupled) to a handle 150 (e.g., a direct connection via fasteners, cogs, adhesive, or the like; indirectly coupled via gearing; or the like). The main shaft 148 and handle 150 may rotate about a second axis B-B' which may or may not be parallel to the spool shaft 136. Due to the interface between the handle 150 and the main shaft 148, rotation of the handle 150 by an angler in turn rotates the main shaft 148.

The fishing reel 100 may also include a main gear 152 rotatably coupled to the main shaft 148 either via gearing, via a direct connection, or the like. The fishing reel 100 may also include a drag gear 154 that is rotatably coupled to the spool shaft 136 either via gearing, via a direct connection, or the like. The main gear 152 is engageable with the drag gear 154. For example, the main gear 152 and the drag gear 154 may each include cogs or other features that facilitate rotational engagement with one another. In that regard and in response to engagement between the main gear 152 and the drag gear 154, rotation of the handle 150 may rotate the main shaft 148, which in turn rotates the main gear 152, which rotates the drag gear 154 (if the amount of force applied to the spool 110 is less than or equal to the set amount of drag), which rotates the spool shaft 136 and the spool 110. In some embodiments, the main gear 152 may remain engaged with the drag gear 154.

The fishing reel 100 may also include a cam and cam track or other axially-actuatable feature positioned adjacent or proximal to the spool shaft 136. The cam or cam track may be coupled to the lever 138 such that actuation of the lever 138 in a first direction (e.g., into the page as shown in FIG. 1) actuates the cam in a first axial direction (e.g., to the left as shown in FIG. 1), and actuation of the lever 138 in a second direction (e.g., out of the page) actuates the cam in a second axial direction (e.g., to the right). Actuation of the lever 138 all the way in the second direction may in turn move the spool shaft 136 to the left, thus separating the second friction surface 142 from the first friction surface 140 such that no friction exists therebetween. This lack of contact between the friction surfaces 140, 142 allows the spool 110 to rotate freely relative to the main housing 104.

Actuation of the lever 138 in the first direction urges the second friction surface 142 towards the first friction surface 140, resulting in contact therebetween. Thus in response to rotation of the spool 110 when the lever 138 is actuated in the first direction, the friction applied to the first friction surface 140 by the second friction surface 142 brakes or otherwise reduces rotation of the spool 110. This is because the first drag surface 140 is coupled to the spool 110 and the second drag surface 142 is coupled to the main housing 104. Thus, the friction between the drag surfaces 140, 142 reduces the ability of the spool 110 to rotate freely relative to the main housing 104. As the lever 138 is urged further in the first direction, the drag surfaces 140, 142 are urged closer together, thus increasing friction therebetween, thus increasing an amount of drag applied to the spool 110. The drag adjustment control mechanism 139 may adjust how much axial force is applied to the drag surfaces 140, 142 (i.e., a distance between the drag surfaces 140, 142), such that actuation of the lever 138 increases or decreases braking force at each location along the path of the lever 138.

As discussed above, the fishing reel 100 includes a cast control mechanism 101 to reduce backlash and increase performance of the fishing reel 100. The cast control mechanism 101 may include portions of the casing 102, the spool assembly 108, and at least one body 130. For example, the cast control mechanism 101 may include an inner surface 106 of the casing 102 (e.g., the inner surface 106 may be defined by the main housing 104), an outer surface 126 of the spool assembly 108 (e.g., the outer surface 126 may be defined by the spool cover 112), and the at least one body 130. In some embodiments, the outer surface 126 may be located radially inward relative to the inner surface 106 of the casing 102. However, one skilled in the art will realize that the surfaces of the cast control mechanism 101 may be located on any additional or alternative components of the fishing reel 100. In some embodiments, the at least one body 130 may have a cylindrical shape, however, other shapes (e.g., triangular prism, rectangular prism, or the like) are also within the scope of the present disclosure.

In the embodiment illustrated in FIGS. 1-6, the cast control mechanism 101 may include the inner surface 106 defined by the main housing 104, the outer surface 126 defined by the spool cover 112, and a plurality of bodies 130. In particular, the inner surface 106 of the main housing 104 may at least partially face the outer surface 126 of the spool cover 112. The outer surface 126 of the spool cover 112 may define at least one pocket 128 that has an opening at least partially facing the inner surface 106 of the main housing 104. The at least one pocket 128 may extend radially relative to the outer surface 107. The at least one pocket 128 may include an elongated aperture or void at least partially defined by the outer surface 126 (or by another component). In some embodiments, the outer surface 126 may be angled relative to the inner surface 106 of the casing 102 (as shown in FIG. 1) and, in some embodiments, the outer surface 126 may extend substantially parallel to the inner surface 106 (i.e., the outer surface 126 may directly face the inner surface 106). The angle may be irrelevant to operation of the cast control mechanism 101 so long as the bodies 130 are sufficiently retained within the pockets 128 and between the outer surface 126 and the inner surface 106 during operation.

In some embodiments, the cast control mechanism may be located between any two surfaces of the fishing reel 100 so long as one surface rotates relative to the other surface. In that regard, pockets may be formed in any outward- or inward-facing surface of the fishing reel, bodies may be located within the pockets, and the pockets may at least partially face another inward or outward-facing surface (which is opposite the first surface) so long as one of the first surface or the second surface rotates relative to the other.

The pocket(s) 128 may be sufficiently large that the at least one body 130 may be received by the pocket 128 (i.e., a circumference of the pocket 128 may be equal to or greater than, and may have a shape that corresponds to, a circumference of the at least one body 130). In some embodiments, the dimensions of the pocket 128 may be sufficiently similar to the dimensions of the body 130 such that the body 130 may move within the pocket 128 (e.g., may move radially inward and outward but relatively restricted from movement in non-radial directions relative to the pocket 128) but remains in the pocket 128 when the fishing reel 100 is assembled (as shown in FIG. 1). Similarly, a length of the body 130, the length of the pocket 128, and the spacing between the outer surface 126 of the spool cover 112 and the inner surface 106 of the main housing 104 may be designed such that the body 130 may move within the pocket 128 between a first position in which the body 130 fails to contact the inner surface 106, and a second position in which the body 130 contacts the inner surface 106. The cast control mechanism 101 may also be designed such that the body 130 is retained within the pocket 128 and between the pocket 128 and the inner surface 106 of the main housing 104 regardless of the position of the body 130 within the pocket. That is, the length of the pockets 128, the length of the bodies 130, and a distance between the outer surface 126 of the spool cover 112 and the inner surface 106 of the casing 102 may be designed such that the bodies 130 are unlikely or unable to become dislodged from the pockets 128 while the casing 102 is assembled around the spool cover 112. Stated differently, a distance between an outer end of the pocket 128 and the inner surface 106 may be less than a total length of the body 130 such that the body 130 remains in the pocket while the fishing reel 100 is assembled.

In some embodiments, the pockets 128 may be evenly spaced circumferentially about the spool cover 112. That is, a distance between each adjacent pocket 128 along the circumference of the spool cover 112 may be the same. Such even spacing provides relatively smooth operation of the fishing reel 100 and cast control mechanism 101 and reduces imbalance within the fishing reel 100. In some embodiments, the pockets 128 may be spaced other than evenly. That is, for example, a greater quantity of pockets 128 may be located on one hemisphere of the spool cover 112 than on an opposing hemisphere of the spool cover 112. Experiments have shown that even spacing of the pockets 128 is unnecessary to achieve desirable performance.

In some embodiments, the cast control mechanism 101 may include any quantity of pockets 128 and bodies 130, and a quantity of pockets 128 may correspond to a quantity of bodies 130 (such that each body 130 corresponds to one pocket 128). For example, the cast control mechanism 101 may include between 1 and 16 of each of the bodies 130 and pockets 128, between 2 and 14, between 4 and 12, between 6 and 10, about 8, or the like. The pockets 128 may be evenly spaced around the outer surface 126 of the spool cover 112, and each body 130 may be received by a respective pocket 128. As mentioned above, installation of the spool cover 112 within the main housing 104 may cause the bodies 130 to remain within the pockets 128 via the inner surface 106 of the main housing 104.

As the fishing reel 100 is used to cast a lure or bait, the spool 110 rotates to allow fishing line to unwind from the spool 110. This rotation of the spool 110 in turn rotates the spool cover 112. The centrifugal force of this rotation of the spool cover 112 urges the bodies 130 outward towards the inner surface 106 of the casing 102 (e.g., the main housing 104). In some embodiments, the bodies 130 or the spool cover 112 may include a magnetic material to attract the bodies 130 towards the spool cover 112 (e.g., urging the bodies 130 radially inward). However, some embodiments lack such magnetic features. In embodiments in which the bodies 130 are attracted to the spool cover 112 (i.e., radially inward via magnetic force as a result of magnetic material in at least one of the bodies 130 or the spool cover 112), the centrifugal force may overcome the attraction of the bodies 130 to the spool cover 112 such that the bodies may contact the inner surface 106. In some embodiments, the force of this urging of the bodies 130 towards the inner surface 106 is based on an angular velocity of the spool shaft 136 such that a greater angular velocity increases the force between the bodies 130 and the inner surface 106, and a reduced angular velocity decreases this force. Rotation of the spool cover 112 (and thus the bodies 130) relative to the inner surface 106 while the bodies 130 are in contact with the inner surface 106 generates friction between the bodies 130 and the inner surface 106 (and the friction may be increased or decreased based on the force, which is based on the angular velocity). This friction slows rotation of (i.e., brakes) the spool cover 112 and, thus, the spool 110. When the lure or bait hits the water, line may stop being removed from the spool 110 (or at least line may not be pulled any further by the lure or bait). This may occasionally result in rotation of the spool 110 while no line is being removed from the spool 110, which may cause the line to become loose and wrap around the spool 110, undesirably causing backlash which may tangle the fishing line. The braking force applied to the spool 110 by the friction between the bodies 130 and the inner surface 106 reduces this unwanted continued rotation of the spool 110, reducing the likelihood of experiencing backlash and, if backlash is experienced, reducing the severity of such backlash.

The design of the cast control mechanism 101 of the fishing reel 100 shown herein provides additional advantages such as allowing access to the cast control mechanism 101 in order to replace the bodies 130 with bodies of a different mass (to increase or decrease braking of the fishing reel 100), to replace damaged bodies 130, to remove the bodies 130 to operate the reel without the cast control mechanism 101, or the like. In that regard, the main housing 104 may be removed from the fishing reel 100 to expose the spool cover 112, thus exposing the pockets 128 and the bodies 130. The bodies 130 may be removed from the pockets 128 and potentially replaced with different bodies 130.

In some embodiments, use of magnetic forces (e.g., by adding magnets in at least one of the spool cover 112 or the bodies 130) may be desirable as it can cause the bodies 130 to remain in the pockets 128 regardless of whether the main housing 104 is installed or not. Likewise, this magnetic force may resist contact between the bodies 130 and the inner surface 106 of the casing 102 unless the angular velocity of the spool cover 112 is sufficiently great so as to cause the centrifugal force to overcome the magnetic force. This reduced contact between the bodies 130 and the inner surface 106 may allow the fishing reel 100 to cast farther than if the bodies 130 are allowed to freely contact the inner surface 106.

The cast control mechanism 101 disclosed herein provides additional benefits and advantages. The cast control mechanism 101 may reduce a total weight of the fishing reel 100 relative to alternative cast control mechanisms by taking advantage of structures within the fishing reel 100. For example, the fishing reel 100 makes use of a casing to enclose various components of the fishing reel for protection from the elements and has an inner surface that may be used as part of the cast control mechanism 101. In addition, use of the spool cover 112 provides multiple functions such as operating as part of the clicking mechanism 118 and functioning to cover the spool 110, thus allowing the cast control mechanism 101 to be functional by only adding the bodies 130. This reduces a total weight of the fishing reel 100 relative to alternative cast control designs, allowing an angler to spend more time fishing before becoming tired.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A fishing reel comprising:
   a casing having an inner surface;
   a spool assembly configured to rotate about an axis and having an outer surface located radially inward relative to the inner surface of the casing and defining at least one pocket;
   at least one body configured to be received by the at least one pocket and to move within the at least one pocket between a first position in which the at least one body fails to contact the inner surface of the casing and a second position in which the at least one body contacts the inner surface of the casing;
   a first drag surface coupled to the casing;
   a second drag surface rotatably coupled to the spool assembly and configured to rotate relative to the first drag surface; and
   a lever, such that the fishing reel is a lever drag fishing reel and actuation of the lever in a first direction causes the first drag surface to contact the second drag surface to generate drag, and actuation of the lever in a second direction causes the first drag surface to separate from the second drag surface to allow the spool assembly to rotate freely relative to the casing.

2. The fishing reel of claim 1, wherein the at least one pocket includes a plurality of pockets spaced about the outer surface of the spool assembly, and the at least one body includes a plurality of bodies each configured to be received by a respective pocket of the plurality of pockets.

3. The fishing reel of claim 2, wherein the plurality of pockets includes between 6 and 10 pockets.

4. The fishing reel of claim 1, wherein the spool assembly includes a spool and a spool cover configured to be coupled to the spool, and wherein the spool cover includes the outer surface defining the at least one pocket.

5. The fishing reel of claim 4, wherein the spool cover includes a clicker portion configured to function as part of a clicking mechanism of the fishing reel, and a spool portion having a greater diameter than the clicker portion, and wherein the outer surface defining the at least one pocket is located on the spool portion of the spool cover.

6. The fishing reel of claim 4, wherein the spool cover is configured to be coupled to the spool via a plurality of fasteners.

7. The fishing reel of claim 4, wherein the first drag surface and the second drag surface are located between the spool and the spool cover when the spool cover is coupled to the spool.

8. The fishing reel of claim 1, wherein the at least one pocket extends in a radial direction such that the at least one body is capable of moving radially outward and radially inward within the at least one pocket relative to the spool assembly.

9. The fishing reel of claim 1, wherein the casing includes a main housing having an outer surface exposed to an environment of the fishing reel and a housing inner surface on which the inner surface of the casing is at least partially located.

10. The fishing reel of claim 1, wherein the at least one body has a cylindrical shape.

11. The fishing reel of claim 1, wherein the at least one pocket has a length that is sufficiently large to retain the at least one body between the at least one pocket and the inner surface regardless of a location of the at least one body within the at least one pocket.

12. A fishing reel comprising:
    a casing having an inner surface;
    a spool assembly configured to rotate about an axis; and
    at least one body having a cylindrical shape and configured to be rotatably coupled to the spool assembly and to rotate with the spool assembly about the axis, the at least one body being further configured to move between a first position in which the at least one body fails to contact the inner surface of the casing and a second position in which the at least one body contacts the inner surface of the casing,
    wherein the spool assembly has an outer surface defining at least one pocket each configured to receive a respective body of the at least one body, and wherein a distance between the outer surface of the spool assembly and the inner surface of the casing is less than a total length of the at least one body to retain the at least one body in the at least one pocket when the fishing reel is assembled.

13. The fishing reel of claim 12, wherein the at least one body includes between 6 and 10 bodies.

14. The fishing reel of claim 12, wherein the spool assembly includes a spool and a spool cover configured to be coupled to the spool, and wherein the at least one body is configured to be rotatably coupled to the spool cover.

15. The fishing reel of claim 12, wherein the casing includes a main housing having an outer surface exposed to an environment of the fishing reel and a housing inner surface on which the inner surface of the casing is at least partially located.

16. The fishing reel of claim 12, wherein the spool assembly defines a plurality of pockets, and wherein the at least one body includes a plurality of bodies each configured to be received by a respective pocket of the plurality of pockets such that each of the plurality of bodies moves between the first position and the second position within the respective pocket.

17. The fishing reel of claim 16, wherein the plurality of pockets each have a length that is sufficiently large to retain a respective body of the plurality of bodies between the respective pocket and the inner surface regardless of a location of the respective body within the respective pocket.

18. A fishing reel comprising:
    a casing having a main housing with an outer surface exposed to an environment of the fishing reel and a housing inner surface on which an inner surface of the casing is at least partially located;
    a spool assembly configured to rotate about an axis and having a spool and a spool cover configured to be coupled to the spool, the spool cover including an outer surface located radially inward relative to the inner surface of the casing and defining a plurality of pockets; and
    a plurality of bodies each configured to be received by a respective pocket of the plurality of pockets and to move within the respective pocket between a first position in which a respective body fails to contact the inner surface of the casing and a second position in which the respective body contacts the inner surface of the casing,
    wherein the spool cover includes a clicker portion configured to function as part of a clicking mechanism of the fishing reel, and a spool portion having a greater diameter than the clicker portion, and wherein the outer surface defining the plurality of pockets is located on the spool portion of the spool cover.

\* \* \* \* \*